United States Patent [19]
Jones

[11] 3,860,498
[45] Jan. 14, 1975

[54] METHOD OF MEASURING $O^2$ AND $O^2$ CONTAINING CONSTITUENTS

[75] Inventor: William J. Jones, Pittsburgh, Pa.

[73] Assignee: Westinghouse Electric Corporation, Pittsburgh, Pa.

[22] Filed: July 2, 1973

[21] Appl. No.: 376,002

[52] U.S. Cl. .............................. 204/1 T, 204/195 S
[51] Int. Cl. ........................................... G01n 27/46
[58] Field of Search ............. 204/1 T, 195 S, 195 R

[56] References Cited
UNITED STATES PATENTS

| | | | |
|---|---|---|---|
| 3,208,926 | 9/1965 | Eckfeldt | 204/195 R |
| 3,514,377 | 5/1970 | Spack et al. | 204/1 T |
| 3,650,934 | 3/1972 | Hickam et al. | 204/195 S |
| 3,691,023 | 9/1972 | Ruka et al. | 204/195 S |
| 3,699,032 | 10/1972 | Rapp | 204/195 S |

*Primary Examiner*—T. Tung
*Attorney, Agent, or Firm*—M. P. Lynch

[57] ABSTRACT

There is described herein a technique for utilizing an oxygen ion conductive solid electrolyte device in a pumping mode to measure the oxygen and oxygen containing constituents of a gas or liquid. The application of an initial potential to the solid electrolyte device effectively removes the free oxygen present in the gas or liquid while the application of an increased potential functions to disassociate oxygen from the oxygen containing constituents and provide an indication of the oxygen containing constituent in terms of the disassociated oxygen.

7 Claims, 3 Drawing Figures

METHOD OF MEASURING $O_2$ AND $O_2$ CONTAINING CONSTITUENTS

BACKGROUND OF THE INVENTION

In many applications, environmental and physiological, the measurement of oxygen and oxygen containing constituents such as carbon dioxide present in a gas or liquid sample is important. While the solid electrolyte galvanic oxygen cell provides direct measurement of free oxygen efforts to extend the capability of the gavanic cell to the measurement of oxygen containing constituents such as carbon dioxide have been less than satisfactory. The requirement for an integrated instrument for simultaneous or sequential measurement of oxygen and oxygen containing constituents using solid electrolyte cell technology has resulted in the technique disclosed herein.

SUMMARY OF THE INVENTION

The invention relates to a technique for sequential measurement of oxygen and oxygen containing constituent, herein selected to be carbon dioxide, of a gas stream by electrochemical ion pumping. The application of a given electrical potential across the electrodes of a solid electrolyte oxygen cell establishes its operation in a pumping mode and at a first given potential the free oxygen present at the cathode is ionized and subsequentially transported through the solid electrolyte and discharged at the anode electrode. The resulting current flow developed by the oxygen ion conductivity is measured in an external circuit and interpreted as a direct coulometric measurement of a transported oxygen. Furthermore by increasing the applied potential the equilibrium oxygen partial pressure can be reduced to a point where the oxygen containing constituents such as carbon dioxide and water vapor can be reduced and the resulting free oxygen removed thereby obtaining a quantitative measure of the oxygen containing constituents.

The electrical current developed by the solid electrolyte electrochemical cell in response to applied potential can be interpreted in several ways to express the derived information in appropriate units. For a "batch" measurement in which the oxygen content of a known volume of a liquid or gaseous sample is desired, the oxygen content of the sample can be injected or liberated into a closed loop containing a solid electrolyte electrochemical cell and subsequentially removed through the pumping operation in multiple recirculations of the sample gas through the cell. In this application, the cell current is integrated over a period of time to yield the quantitative measure of the moles of the oxygen removed. This information can be further processed if desired to yield the partial pressure of a gas sample or liquid if the solubility coefficient is known.

This technique can also be applied to continuous measurements if the solid electrolyte cell is designed and constructed so that an equlibrium condition is obtained in a single pass of the gas through the cell. In this configuration, the cell current can be directly interpreted without integration as an indication of the oxygen content of the sample, provided the sample flow rate is known.

By completely liberating the gas content of a liquid into the gas stream passing through the solid electrolyte cell, the measuring technique can be applied to liquid as well as gas samples.

Differentiation between free oxygen and oxygen combined in other species is obtained by the control of the applied potential to the solid electrolyte cell. The pumping process reaches an equilibrium when the back EMF (galvanic) provided by the cell according to the Nernst equation equals the applied potential. Using ambient air as the receiving or reference environment at the cell electrode (anode) remote from the sample, an applied potential of between 0.3 and 0.6 volts will insure essentially complete removal of free oxygen from the gas at the cathode when equilibrium is reached. This level of applied voltage will not reduce the oxygen present in oxygen containing constituents. Once the free oxygen is removed, the applied potential can be increased in the same or an additional cell to reduce the oxygen containing gas species and derive quantitative information on the content present in the sample. If only one such species is present at the cell, such as carbon dioxide in a dry sample stream, the cell current can be related directly to the content of that species in the sample. If more than one reducible oxygen containing species is present, such as carbon dioxide and water vapor, the cell current will reflect the content of the combined species. If, however, some additional information is available regarding the ratio of the various species, or the absolute level of one of the species, specific information as to the individual species content in the sample can be derived.

DESCRIPTION OF THE DRAWINGS

The invention will become more readily apparent from the following exemplary description in connection with the accompanying drawings.

DESCRIPTION OF THE PREFERRED EMBODIMENTS

Figure 1:
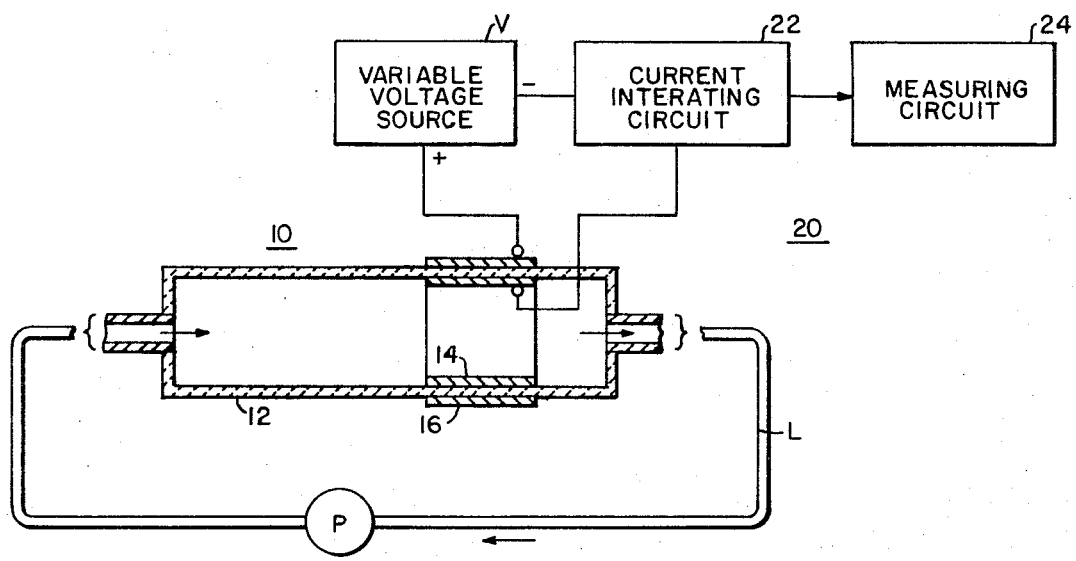
FIGS. 1, 2 and 3 are schematic illustrations of typical embodiments of the invention.

Referring to FIG. 1 there is illustrated a basic application of the invention wherein a solid electrochemical cell 10 of the type described and illustrated in U.S. Pat. No. 3,400,054 comprises a tubular solid electrolyte oxygen ion conductive member 12 and electrodes 14 and 16. The gas sample to be monitored is circulated in loop L through the cell 10 in contact with electrode 14 by pump P. It has been determined experimentally that the application of a cell potential across the electrodes 14 and 16 by a variable voltage source V of a polarity indicated will cause the solid electrolyte electrochemical cell 10 to function as an oxygen pump thereby pumping the free oxygen contained in the gas sample through the solid electrolyte member 10 to the oxygen media herein indicated to be air. A typical applied voltage applicable for use with zirconia stabilized solid electrolyte electrochemical cells for pumping free oxygen from a gas has been determined to be in the range of 0.3–0.6 volts. Upon application of 0.6 volts across the cell in accordance with the polarity indicated, the oxygen ion migration through the solid electrolyte member causes an electron flow through the circuit 20 in the form of a cell current. The embodiment of FIG. 1 corresponds to a "batch" process wherein a predetermined volume of gas to be analyzed is injected into the loop of oxygen-free gas and circulated numerous times through the cell 10 until all the free oxygen has been removed. Due to the requirement for numerous circulations of the gas to achieve the desired condition the cell current is integrated with respect to time by the integrating circuit. The output of the current integrating circuit 22 is applied to measuring circuit 24 which provides an indication of the oxygen partial pressure of the gas sample circulated through loop L.

On completion of the pumping of the free oxygen of the gas sample, a back EMF is developed as a result of the depletion of oxygen which effectively equals the 0.6 volts applied, thus effectively bucking or nulling the effect of the applied potential causing the current through the circuit 20 to be reduced to zero.

In the event it is desirable to measure an additional gas constituent such as carbon dioxide, the applied potential from voltage source V is increased to a level sufficient to produce dissociation of the oxygen present in the carbon dioxide. This potential has been determined experimentally to be approximately 1.2 volts for $CO_2$. The application of 1.2 volts causes dissociation of essentially all the $CO_2$ to CO and $O_2$ and the free oxygen thus produced is pumped from the gas sample. The moles of oxygen removed will be exactly one-half of the moles of $CO_2$ originally present as represented by the equation: $CO_2 \rightarrow CO + \frac{1}{2} O_2$. This relationship permits the accurate representation of the output of the integrating circuit 22 as a measure of the $CO_2$ originally present in the gas sample.

While the above illustration has been directed to the combination of free oxygen and carbon dioxide in a gas, it is apparent that such a technique can be used with other combinations of oxygen and oxygen containing constituents in a gas or liquid. The above description of the operation of the embodiment of FIG. 1 is by way of example only.

Figure 2:
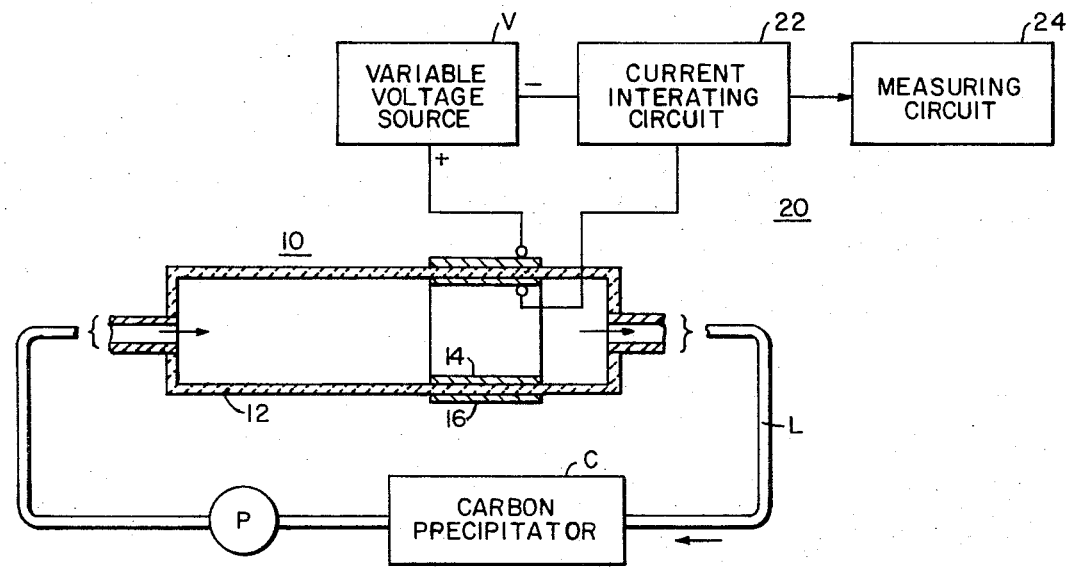

In practice, it has been determined that the life of a zirconia stabilized electrolyte is adversely effected by the application of a potential in excess of 0.9 volts due to a partial reduction of the zirconia electrolyte. The operation of the solid electrolyte electrochemical cell for the measurement of $CO_2$ at cell voltages of 0.9 volts would result in only partial reduction of the $CO_2$. Although this factor can be compensated for in the measuring circuit 24, the operation at reduced applied potential makes the device 10 unduly sensitive to operational parameters such as cell temperature, cell voltage, and reference oxygen pressure. In order to compensate for the characteristics of the zirconia stabilized solid electrolyte cell, there is illustrated in FIG. 2 the use of a carbon precipitator c in the gas loop L. The carbon precipitator, which effectively is a catalytic reactor, functions to recombine the CO developed by the dissociation of oxygen from the $CO_2$ to again form $CO_2$ and precipitate pure carbon in accordance following reaction:

$$2CO \rightarrow CO_2 + C \downarrow$$

Complete reduction of the $CO_2$ initially present in the gas sample and the coulometric measurement of the corresponding removed oxygen is possible at a reduced applied voltage by recycling the gas sample a number of times through the solid electrolyte-electrochemical cell device 10. For example, if 80% of the $CO_2$ initially present is reduced to CO, as occurs with application of applied potential of 0.9 volts, in each pass of the gas sample through the solid electrolyte-electrochemical cell device 10 and all the CO is recombined in the carbon precipitator C, then the amount of $CO_2$ reduced to C and $O_2$ is:

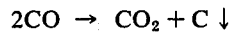

$$c/o \text{ Reduction } CO_2 = [1-(0.2)^n] \times 100$$

where $n$ is the number of cycles or passes of the sample gas through the solid electrolyte-electrochemical device 10. For a gas sample containing carbon dioxide, with an applied potential for the dissociation of carbon dioxide of 0.9 volts, a value for $n$ of 4 will result in a percent reduction of $CO_2$ of approximately 99.8. Thus, essentially complete reduction of $CO_2$ to oxygen and elemental carbon may be accomplished at reasonable voltage levels. Thus the dissociation of oxygen from carbon dioxide can be realized by applying a potential in the range of 0.9–1.2 volts.

Figure 3:
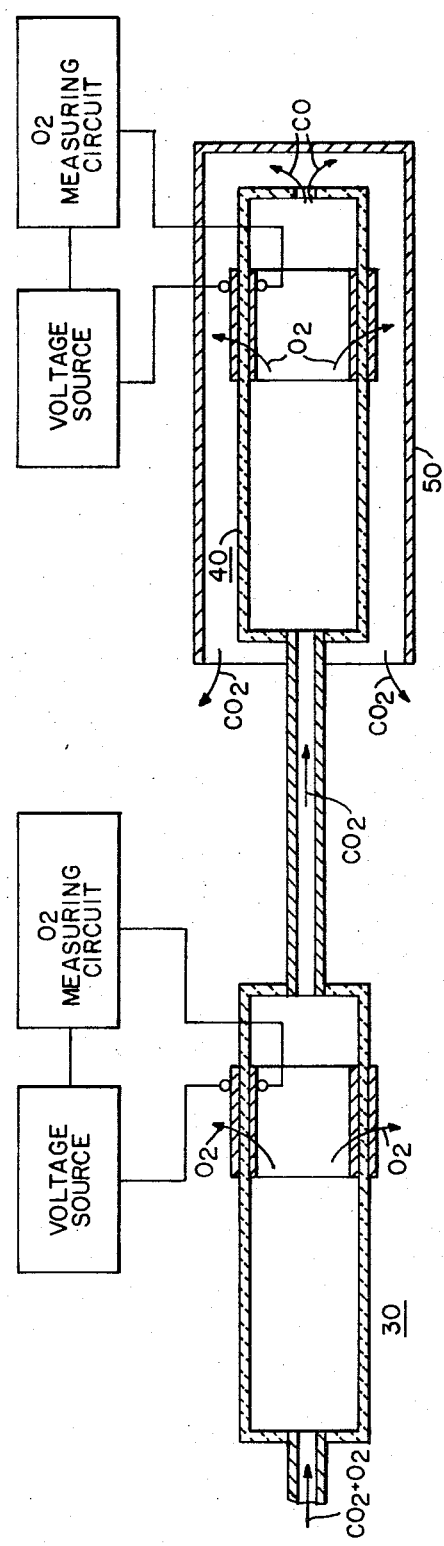

There is illustrated in FIG. 3 an embodiment of the invention for continuous in contrast to batch measurement of free oxygen and oxygen containing constituents in a flowing gas stream. In the embodiment of FIG. 3 there are two solid electrolyte-electrochemical cell devices 30 and 40. A potential of approximately 0.6 volts is supplied to the electrodes of the cell device 30 in accordance with the discussion related in FIG. 1 to establish the cell 30 for monitoring the free oxygen contained in the gas flow. A potential of approximately 1.2 volts is applied to the electrodes of the cell device 40 to establish the operation in accordance with the above description to monitor the partial pressure of an oxygen containing constituent such as carbon dioxide present in the gas flow. The cell device 40 however is enclosed within a housing 50 such that the carbon monoxide developed as a result of the dissociation of oxygen from carbon dioxide is directed in a reverse flow pattern across the outside of the cell device 40 to serve as the oxygen media for the cell device 40. The use of the carbon monoxide as the oxygen media provides two significant advantages in that the level of applied voltage required to dissociate carbon dioxide present in the gas flow to oxygen and carbon monoxide is substantially reduced when carbon monoxide is utilized as a reference in contrast to the use of air as the oxygen reference. Therefore it is no longer necessary to apply the 1.2 volts which as indicated above can have an adverse effect on the solid electrolyte material. Furthermore, the pumping of the oxygen from the carbon dioxide present within the cell device 40 into the carbon monoxide reference environment results in recombination of CO and $O_2$ and the formation of carbon dioxide for subsequent exhausting to the atmosphere. This results in the obvious advantage of exhausting carbon dioxide and thus eliminating hazards of exhausting carbon monoxide.

While the above illustrations have been with reference to gas samples, it is apparent that the techniques described are equally applicable to liquids containing oxygen. All that is required for application of this technique to liquids is the inclusion of means for liberating the oxygen constituents into a gas phase. This can be most simply accomplished by stirring or bubbling a gas through a liquid or as in the case of the technique used in blood analysis, through the addition of chemical reactants to the liquid to liberate the oxygen into a gas phase.

I claim as my invention:

1. A method for measuring the partial pressure of oxygen and oxygen containing constituents of a gas through the use of a solid electrolyte oxygen ion conductive electrochemical cell operating as a pump, comprising the steps of, establishing an oxygen media in contact with a first electrode of an electrochemical cell comprised of an oxygen ion conductive solid electrolyte and first and second electrodes disposed on opposite surfaces thereof, circulating an oxygen-containing gas in a closed loop flow in contact with the second electrode, applying a potential across said electrodes to effect pumping of the free oxygen in said gas through said solid electrolyte to the oxygen media, adjusting the magnitude of said potential to effectively remove all free oxygen from said gas without causing significant dissociation of oxygen from oxygen-containing constituents in said fluid, said pumping of said free oxygen ions producing a cell current, integrating said cell current produced by said pumping of oxygen to produce an electrical signal indicative of the free oxygen contained within said gas, increasing the applied voltage to a magnitude sufficient to dissociate the oxygen contained in said oxygen-containing constituents present within said gas, pumping the dissociated oxygen through said solid electrolyte to said oxygen media, circulating said gas in a closed loop flow across said second electrode until dissociation is substantially complete, and integrating the cell current developed as a result of the pumping of oxygen dissociated from said oxygen-containing constituents as an indication of the oxygen-containing constituent in said gas.

2. A method as claimed in claim 1 wherein said oxygen-containing constituent is carbon dioxide, said dissociation results in the pumping of oxygen through said solid electrolyte member with a residual amount of carbon monoxide remaining in said gas, further including the step of converting said carbon monoxide to carbon dioxide and elemental carbon and removing said elemental carbon.

3. A method as claimed in claim 1 wherein said applied potential is in the range of 0.3 to 0.6 volts for pumping the free oxygen.

4. A method as claimed in claim 1 wherein said oxygen-containing constituent is carbon dioxide and said applied voltage for dissociating oxygen from said carbon dioxide is in the range of 0.9 to 1.2 volts.

5. A method for measuring the partial pressure of oxygen and oxygen-containing constituents of a gas through electrochemical ion pumping, comprising the steps of, establishing an oxygen media in contact with a first electrode of a first electrochemical cell comprised of an oxygen ion conductive solid electrolyte and a first and second electrode disposed on opposite surfaces thereof, supplying an oxygen-containing gas in contact with the second electrode, applying a potential across said first and second electrodes to effect pumping of the free oxygen in said gas through said solid electrolyte to the oxygen media, adjusting the magnitude of said potential to effectively remove all free oxygen from the gas without significantly dissociating oxygen from oxygen-containing constituents in the gas, the pumping of said oxygen ions through said solid electrolyte developing a cell current which is a function of the free oxygen content of said gas, measuring said current, subsequently supplying said gas in contact with a first electrode of a second electrochemical cell comprised of an oxygen ion conductive solid electrolyte and a first and second electrode disposed on opposite surfaces thereof, establishing an oxygen media in contact with the second electrode of said second electrochemical cell, applying a potential across said electrodes of said second electrochemical cell, adjusting the magnitude of said potential to a level sufficient to dissociate the oxygen from the oxygen-containing constituents in said gas, the dissociated oxygen being pumped through said solid electrolyte of said second electrochemical cell to the oxygen media, said pumping of said oxygen producing a cell current from said second electrochemical cell which is representative of the content of said oxygen-containing constituent in said gas and measuring said current.

6. A method as claimed in claim 5 wherein said oxygen containing constituent is carbon dioxide and the dissociation of said carbon dioxide produces oxygen and carbon monoxide further including the steps of supplying said carbon monoxide as the oxygen media for said second electrochemical cell and recombining the oxygen pumped through the solid electrolyte of said second electrochemical cell with said carbon monoxide to form carbon dioxide.

7. A method for determining the carbon dioxide content of a gas by electrochemical ion pumping, comprising the steps of, passing the gas containing carbon dioxide in contact with a first electrode of an electrochemical cell comprised of an oxygen ion conductive solid electrolyte and a first and second electrode disposed on opposite surfaces thereof, applying a potential across said first and second electrodes of a magnitude to dissociate the oxygen from said carbon dioxide to produce oxygen and carbon monoxide, pumping said dissociated oxygen from said gas through said solid electrolyte to said second electrode to produce a current representative of the carbon dioxide content in said gas, measuring said current, and directing said carbon monoxide to recombine with said dissociated oxygen at said second electrode to form carbon dioxide.

* * * * *